United States Patent [19]

Gibbs

[11] 3,825,712

[45] July 23, 1974

[54] WELDING PROCESS
[75] Inventor: Francis E. Gibbs, Pleasanton, Calif.
[73] Assignee: Kaiser Aluminum & Chemical Corporation, Oakland, Calif.
[22] Filed: Aug. 3, 1972
[21] Appl. No.: 277,566

[52] U.S. Cl. .................. 219/137, 219/123, 219/74
[51] Int. Cl. .............................................. B23k 9/00
[58] Field of Search ............. 219/137, 123, 118, 74

[56] References Cited
UNITED STATES PATENTS
1,243,589  10/1917  Coffin ............................. 219/123
2,859,328  11/1958  Sohn ................................ 219/74
3,102,946  9/1963  Fonberg ........................... 219/123
3,328,556  6/1967  Nelson et al. .................... 219/137
3,483,354  12/1969  Manz et al. ...................... 219/137
3,551,637  12/1970  Lampson .......................... 219/123

Primary Examiner—J. V. Truhe
Assistant Examiner—G. R. Peterson
Attorney, Agent, or Firm—Paul E. Calrow; Edward J. Lynch

[57] ABSTRACT

This invention relates to a narrow-groove Gas-Tungsten-Arc (GTA) welding process for the butt welding of thick aluminum plates wherein the arc is oscillated across the width of the groove at a frequency between 100 and 300 cycles per minute. Shorter welding times and improved weldment soundness are obtained.

15 Claims, 6 Drawing Figures

WELDING PROCESS

BACKGROUND

GTA welding, sometimes called Tungsten-Inert Gas (TIG) welding, is a well known method for the fusion welding of metal products wherein an arc is struck between a nonconsumable tungsten electrode and the workpiece to be welded. The electrode, arc and workpiece are shielded with an inert gas such as helium, argon, or mixtures thereof. When applied to aluminum, the welding process is characterized by forming high quality, nonporous, welds. For thin aluminum materials, filler metal is usually not needed unless the material is crack prone. Thick plate with groove-type edge preparation require filler metal to fill the groove. Heat treatable alloys, even if not grooved, may require filler material to prevent weld bead cracking.

For welding materials from about one-fourth inch to three-fourths inch thick, direct current with straight polarity (electrode negative) is preferred because the heat concentration is 70% at the workpiece and 30% at the electrode. For welding very thin materials, e.g., below 0.05 inch thick, direct current with reverse polarity (electrode positive) is sometimes used because of the cleaning action which removes oxide from the workpiece surface, even though the reverse polarity has an undesirable heat balance of about 70% at the electrode and 30% at the workpiece. For welding material up to 1/2 inch thick alternating current is frequently preferred because the heat distribution is balanced between the electrode and the workpiece. Moreover, the alternating current has a desirable cleaning action which removes oxide from the workpiece surface.

The GTA welding process forms a high quality weld but it has been heretofore more or less limited to welding material less than three-fourths inch thick because of its relatively slow deposition rates. Manns et al in U.S. Pat. No. 3,483,354 attempted to increase the filler metal deposition rates by independently preheating the filler metal so as to melt the filler metal as it enters the weld pool. Although the improvement was substantial for welding ferrous materials, the deposition rates for welding aluminum were not increased significantly because the increased energy input is only about 1% of the total energy input when welding aluminum. When the filler wire is preheated in ferrous metal welding the increased energy is about 30% of the total.

By reducing the welding groove width welding time can be reduced because the number of passes required to fill the groove are reduced. This process is commonly termed "narrow-groove welding". However, the narrow groove welding of thick aluminum plates by the GTA process has presented difficult problems because of lack-of-fusion defects from nonwetting and the formation of oxide plates or planes. Moreover, the surface of the weld bead is extremely rough requiring extensive between-pass surface preparation. Due to the increased between-pass surface preparation required, the overall welding time was not significantly improved.

Against this background the present invention was developed.

SUMMARY OF THE INVENTION

The process of the present invention relates to the narrow groove welding of thick metal plates, particularly aluminum plates from three-fourths inch to 6 inches thick. In the process, two plates are placed in abutting relationship so the ends of the plates form a narrow welding groove with the maximum width of the groove ranging from about .2 to .75 inch. A nonconsumable electrode, preferably thoriated tungsten electrode, is inserted in the groove and enveloped in an inert atmosphere such as helium. For aluminum materials the gas contains more than 75%, preferably more than 90% helium. Straight polarity, direct current (DCSP) of 200–600 amperes is passed from the electrode to the workpiece, thus striking an arc which forms a pool of molten metal in the groove. In the welding groove a variable polarity electromagnetic field is generated which is of sufficient intensity and frequency to oscillate the arc across the width of the groove from about 100–300 cycles per minute (cpm). The electrode with the attendant oscillating arc is then passed longitudinally along the length of the groove at a speed of from about 5 to about 20 inches per minute. Filler metal is introduced into the weld pool as the electrode passes down the groove. To minimize oxide occulsion and porosity the filler metal preferably is preheated prior to introduction into the pool of molten metal. The weldment formed by the process of the present invention is sound and needs little or no between-pass surface preparation other than the removal of surface smut or soot with a cloth or wire brush.

BRIEF DESCRIPTION OF THE DRAWINGS

In the drawings all corresponding parts are numbered the same.

DETAILED DESCRIPTION OF INVENTION

It has been found that by electromagnetically oscillating the arc at a frequency within a particular range that sound, relatively oxide free butt welds can be made between thick aluminum plates with the narrow-groove GTA welding process. Because the weld bead is relatively smooth, no extensive between-pass surface preparation is needed and the total welding time is significantly reduced.

Figure 2:
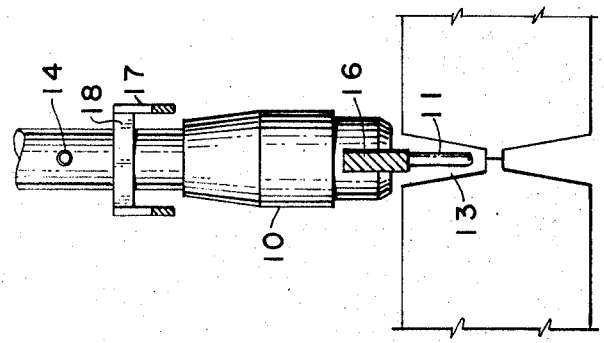
FIG. 2 is the view taken along the line A—A of FIG. 1.
Figure 1:
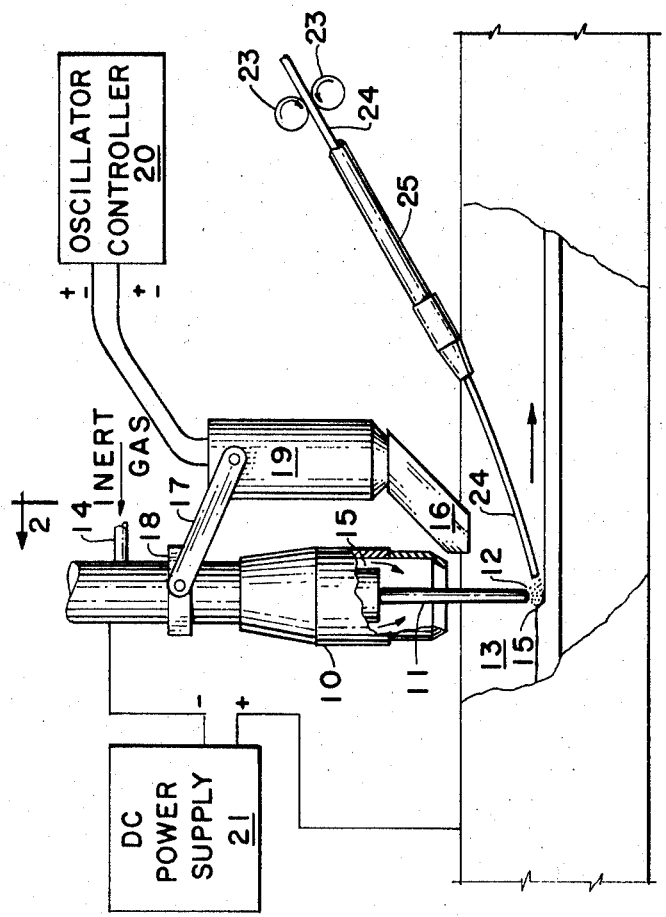
FIG. 1 is a side view partially in section of an apparatus for carrying out the process of the present invention.

Reference is made to FIGS. 1 and 2, wherein an apparatus for carrying out the present invention is shown. The welding torch is generally indicated at 10. Supported within the welding torch 10 is a tungsten electrode 11, the tip 12 of which is positioned within the groove 13 and spaced a short distance from the bottom of the groove. Inert gas is introduced into the welding torch 10 through conduit 14 and passed through the annular passageway 15 in the weld torch 10 to shield the electrode 11 and the weld pool 15 which forms at the bottom of the groove. Electromagnetic pole piece or probe 16 for oscillating the arc is positioned in close proximity to the electrode preferably in the groove as shown in the drawing. The pole piece 16 is affixed to the electromagnetic generating unit or coil 19 which is suitably connected to the welding torch 10 by arm 17 and collar 18. The magnitude and frequency of the electromagnetic field is controlled by controller 20.

The electrode 11 is electrically connected to the negative terminal of a direct current power supply 21 whereas the workpiece 22 is connected to the positive terminal. Suitable control devices (not shown) are usually provided to control the arc length, current and the like. Feeding rolls 23 are provided to feed the weld filler wire 24 to the weld puddle 15 through a guiding sleeve 25 during welding. If desired, additional inert gas can be introduced by suitable means at the bottom of the groove to assure complete shielding of the weld pool with inert gas. The direction of welding head travel is indicated by the arrow.

Figure 3:
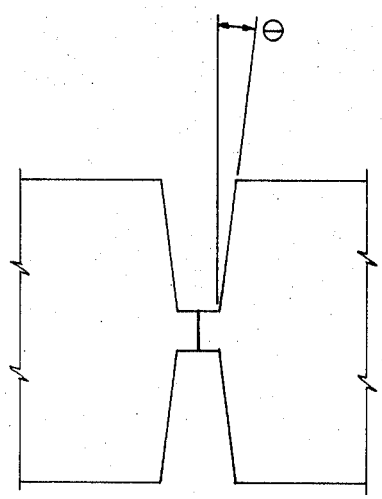
FIGS. 3–6 are cross-sectional views of typical groove configurations for the present invention.
Figure 4:
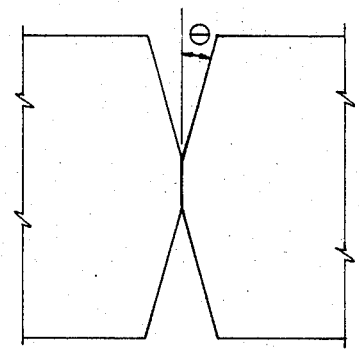
Figure 5:
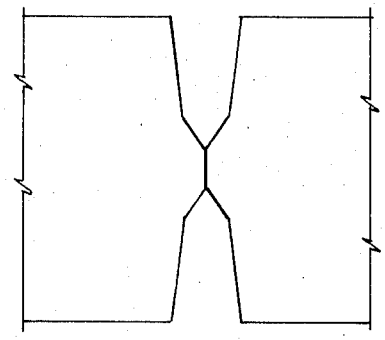
Figure 6:
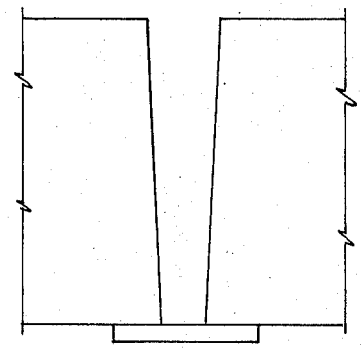

The welding groove of the present invention can be of any conventional design, such as shown in FIGS. 3–6. The groove, which is generally U-shaped or V-shaped, should not exceed 0.75 inch nor be less than 0.2 inch in width at its widest point. The sidewalls of the groove can be inclined outwardly from the bottom of the groove at an angle $\theta$ of up to 15° from the vertical, but preferably the angle $\theta$ is maintained as small as possible. In practice generally the top groove in FIGS. 3–5 is first prepared, several weld passes are made and then the bottom groove is prepared having a depth which is sufficient to expose weld metal from the initial weld passes.

In accordance with the invention, an arc is struck between the tungsten electrode and the bottom of the groove by passing a straight polarity direct current of about 200 to 600 amperes therebetween. Arc voltages range from about 10 to 15 volts. Inert gas containing at least 75% helium, preferably more than 90% helium, shields both the electrode, the arc and the weld pool which forms in the bottom of the groove. Inert gas flow rates of about 50 to 300 cubic feet per hour usually provide adequate shielding. For very deep grooves, it may be desirable to introduce portions of the inert gas at the bottom of the groove to insure complete shielding of the weld pool. The arc is caused to oscillate across the width of the groove by a variable polarity electromagnetic field which crosses the arc. For smooth, relatively oxide-free weld beads the frequency of oscillations must be between about 100 and 300 cpm, preferably between 150 and 220 cpm. A suitable means to oscillate the arc is the electromagnetic field generator Cyclomatic 70 sold by the Data Science Corporation. Arc oscillations outside of this range result in a very rough bead surface, lack of fusion defects from poor wetting and high oxide occlusion frequency. Moreover, at frequencies below 100 cpm the weldments frequently have lack of fusion defects from oxide planes or flakes. The variable polarity magnetic field is not only directing the arc, but apparently is also distributing molten metal across the width of the groove, thus minimizing the problems of metal pile-ups, electrode contaminations, variations in filler wire feeding rates, electrode travel speed and the position of filler wire in the pool of molten metal, all of which tend to detrimentally affect the quality of the resultant weldment. Little or no surface preparation between passes is usually necessary in the process of the present invention other than removing the surface smut or soot with a cloth or wire brush.

During welding, the filler wire is introduced into the weld pool preferably at the leading edge at a rate of about 1 to 6 lbs. per hour which is substantially more than the amount of filler wire that can be added to normal GTA welding and still form sound welds. It is preferred to independently preheat the filler wire to a temperature of about 300°F to 900°F before it penetrates the weld pool to remove any water on the surface of the wire and to break up the natural oxide coating. This procedure can significantly reduce the oxide occlusions in the weldment. By independently preheating is meant heating the weld wire by means other than the arc or weld pool such as by $IR^2$ heating by passing a current through the weld wire. During welding the filler wire should be pressed firmly against the bottom of the groove to prevent any contamination of the electrode. Torch travel speed for most thick plate applications ranges from about 3 to 20 inches per minute. Subsequent weld beads are placed in the groove in the same or similar manner until the groove is completely filled.

The process of the present invention is competitive with the gas-metal-arc (GMA) process, particularly the GMA process employing relatively thick weld wire and employing conditions which effect a globular transfer from the electrode to the molten metal pool as described in U.S. Pat. No. 3,047,713 (Liptak) assigned to the present assignee. However, in the process described by Liptak, the weld pool of molten metal is so large that out-of-position (other than flat) welding is not practical because the molten metal runs out of the weld pool. With the present invention, the pool of molten metal is relatively small and it is more or less controlled by the magnetic forces allowing for both horizontal and vertical out-of-position welding. As recognized by those skilled in the art the flat position refers to a butt weld groove wherein the workpiece and groove are in a generally horizontal plane. In a horizontal position the workpiece is in a plane inclined from the horizontal but the groove is horizontal. In a vertical position both the workpiece and groove are in a plane inclined from the horizontal.

The following examples are given to further illustrate the invention. In these examples, 5183 weld filler wire (1/16 inch diameter) was employed for welding the 5083 plate; whereas, 5039 weld filler wire (1/16 inch diameter) was employed for welding the 7039 plate. Filler wire feed rates were about 160 inches/minute or about 2.9 lbs/hour. The inert gas shield was 100% helium. The welding current was generally higher during the initial passes. Arc voltage varied from about 13 to 15 volts. The groove design was that shown in FIG. 3. Plate composition and thickness and groove dimensions are given in Table 1. Welding parameters are given in Table 2.

TABLE I

| Sample No. | Plate Alloy[1] and Temper[1] | Plate Thickness, in. | Angle of Sidewalls | Maximum Width of Groove, in.[2] |
|---|---|---|---|---|
| 1 | 5083-H115 | 1.75 | 5° | 0.46 |
| 2 | 5083-F | 2.50 | 4° | 0.49 |
| 3 | 7039-T64 | 2.00 | 4° | 0.45 |
| 4 | 5083-H113 | 2.00 | 4° | 0.45 |
| 5 | 5083-H113 | 2.00 | 4° | 0.45 |

TABLE I — Continued

| Sample No. | Plate Alloy[1] and Temper[1] | Plate Thickness, in. | Angle of Sidewalls | Maximum Width of Groove, in.[2] |
|---|---|---|---|---|
| 6 | 5083-H321 | 1.50 | 4° | 0.42 |
| 7 | 5083-H321 | 1.50 | 4° | 0.42 |
| 8 | 5083-H321 | 1.50 | 4° | 0.42 |

1. Aluminum Association Designations.
2. At plate surface. All groove depths were equal to one-half the plate thickness. Groove widths at bottom were 0.31 (5/16th) inch.

TABLE II

| Sample No. | No. of Passes | Current, amps | Travel Speed, in./min. | Wire Feed, in./min. | Osc. Frequency, cpm | Gas Flow, CFH | Position | TS of Weld, psi | Elongation, % in 2 in. |
|---|---|---|---|---|---|---|---|---|---|
| 1 | 7 | 450 | 6 | 156 | 125 | 160 | Flat | 44,800 | 24.0 |
| 2 | 10 | 425-500 | 6 | 156 | 125 | 100-150 | Flat | 44,500 | 32.0 |
| 3 | 8 | 440-475 | 6 | 156 | 125 | 150 | Flat | 54,100 | 15.7 |
| 4 | 10 | 280-430 | 8 | 160 | 120 | 200 | Horiz. | 42,000 | — |
| 5 | 9 | 360-430 | 8 | 160 | 240 | 200 | Horiz. | 42,000 | — |
| 6 | 8 | 280-430 | 8 | 160 | 240 | 200 | Horiz. | 43,200 | — |
| 7 | 8 | 285-430 | 8 | 160 | 240 | 200 | Vert. | — | — |
| 8 | 8 | 290-430 | 8 | 160 | 160 | 200 | Vert. | 45,200 | — |

The weldments of the present invention show surprisingly little reduction in strength over the base metal. All the weldments described above were sound and essentially free of porosity. For tensile testing of the weldments the surface weld beads were machined level with the plate surface.

As used herein the term "aluminum" refers to pure aluminum, commercially pure aluminum and aluminum alloys containing more than 75% aluminum.

It is obvious that various modifications and improvements can be made to the present invention without departing from the spirit of the invention and the scope of the appended claims.

What is claimed is:

1. In the method of narrow groove welding of relatively thick aluminum members wherein the aluminum members are positioned adjacent each other so as to form a narrow welding groove greater than 0.2 inch but less than 0.75 inch in width, a nonconsumable tungsten electrode is placed in said groove, an electrical arc is established between said electrode and the bottom of said groove to form a weld pool of molten metal therein, said electrical arc and weld pool are shielded by a gas containing at least 75% helium, said electrode is passed longitudinally along the groove and weld filler metal is introduced into said weld pool of molten metal as said electrode travels along said groove, the improvement comprising generating in said groove a variable polarity electromagnetic field of sufficient amplitude and frequency to oscillate said arc across the width of the groove at a frequency of about 100-300 cycles per minute.

2. The method of claim 1 wherein said aluminum members are positioned so as to form a groove at least 0.75 inch deep.

3. The method of claim 1 wherein the arc is oscillated across the width of the groove at a frequency of about 150 to 220 cycles per minute.

4. The method of claim 1 wherein said filler metal is independently heated to a temperature between 300° and 900°F. before introducing said filler metal into the pool of molten metal.

5. The method of claim 1 wherein said filler metal is added at a rate of about 1 to 6 pounds per minute.

6. The method of claim 1 wherein said inert gas contains at least 90% helium.

7. The method of claim 1 wherein said inert gas is introduced into the welding area comprising the electrode, the arc and the molten metal pool at a rate of about 50 to 300 cubic feet per hour.

8. The method of claim 1 wherein said electrode is passed along the said groove at a rate of about 3 to 20 inches per minute.

9. The method of claim 1 wherein said arc is established by passing a straight polarity, direct current of about 200 to 600 amperes between said electrode and the aluminum plates.

10. The method of claim 1 wherein the process is repeated until the welding groove is filled.

11. The method of claim 1 wherein the vertical walls of said groove are inclined outwardly from the bottom of the groove at an angle of up to 15° from the vertical.

12. The method of claim 1 wherein said plates are in essentially a horizontal plane.

13. The method of claim 1 wherein said plates are inclined at an angle from the horizontal.

14. The method of claim 12 wherein said groove is in a horizontal direction.

15. The method of claim 1 wherein said groove is in a vertical direction.

* * * * *